(12) United States Patent
Hochanadel (10) Patent No.: US 9,630,464 B2
(45) Date of Patent: Apr. 25, 2017

(54) TRAILER TONGUE ALIGNMENT ASSEMBLY

(71) Applicant: Todd Hochanadel, Issaquah, WA (US)

(72) Inventor: Todd Hochanadel, Issaquah, WA (US)

(*) Notice: Subject to any disclaimer, the term of this patent is extended or adjusted under 35 U.S.C. 154(b) by 0 days.

(21) Appl. No.: 15/056,932

(22) Filed: Feb. 29, 2016

(65) Prior Publication Data

US 2016/0176253 A1 Jun. 23, 2016

Related U.S. Application Data

(63) Continuation-in-part of application No. 14/639,955, filed on Mar. 5, 2015, now Pat. No. 9,272,590.

(60) Provisional application No. 61/948,217, filed on Mar. 5, 2014.

(51) Int. Cl.
  *B60D 1/36* (2006.01)
  *B60D 1/06* (2006.01)

(52) U.S. Cl.
  CPC ............. *B60D 1/363* (2013.01); *B60D 1/065* (2013.01)

(58) Field of Classification Search
  CPC .................................................... B60D 1/363
  See application file for complete search history.

(56) References Cited

U.S. PATENT DOCUMENTS

| | | | |
|---|---|---|---|
| 3,150,884 A | 9/1964 | Droit | |
| 4,254,968 A * | 3/1981 | DelVecchio | B60D 1/363 280/477 |
| 4,792,151 A | 12/1988 | Feld | |
| 4,903,978 A | 2/1990 | Schrum, III | |
| D311,511 S | 10/1990 | Craig | |
| 4,988,116 A | 1/1991 | Evertsen | |
| 5,114,170 A | 5/1992 | Lanni et al. | |
| 5,435,587 A | 7/1995 | Beddows | |
| 5,454,582 A | 10/1995 | Rines | |
| 5,758,893 A | 6/1998 | Schultz | |
| 5,909,892 A | 6/1999 | Richardson | |
| 5,927,742 A | 7/1999 | Draper | |
| 6,179,318 B1 | 1/2001 | Howard | |
| 6,382,653 B1 | 5/2002 | Bass | |
| 6,796,573 B2 | 9/2004 | Beaudoin | |
| 7,131,658 B2 | 11/2006 | MacKarvich | |
| 7,744,110 B1 | 6/2010 | Ramon | |
| 9,272,590 B2 | 3/2016 | Hochanadel | |

(Continued)

*Primary Examiner* — Kevin Hurley (74) *Attorney, Agent, or Firm* — Dean Craine; Marisa Whitaker (57) ABSTRACT

An alignment assembly that automatically aligns the inverted ball socket on a trailer tongue and temporarily raises the ball socket over a ball mounted on the end of the towing vehicle as the towing vehicle is being backed up. The assembly includes a tongue mount attached to the front edge of the ball socket on a trailer. The tongue mount includes a vertical, transversely aligned front plate in front of the ball socket. Selectively attached to the front plate is a vertical sliding transverse plate that attaches to a forward extending, diagonally aligned guide tunnel. The guide tunnel includes a wide front opening and narrow rear opening that terminates directly in front of the ball socket. During use, the ball travels rearward into the guide funnel which creates a lifting force on the guide funnel. Upward force on the guide funnel causes the trailer tongue to lift. When the ball clears the guide tunnel, the ball socket falls and is aligned with the ball.

10 Claims, 9 Drawing Sheets

(56) References Cited

U.S. PATENT DOCUMENTS

2007/0205580 A1* 9/2007 Hamilton ............... B60D 1/66
       280/477
2010/0225091 A1  9/2010 Adkins

* cited by examiner

TRAILER TONGUE ALIGNMENT ASSEMBLY

This utility patent application is a continuation in part application of U.S. utility patent application (application Ser. No. 14/639,955) filed Mar. 5, 2015 which claims the filing date benefit of U.S. provisional patent application (Application No. 61/948,217) filed on Mar. 5, 2014.

Notice is given that the following patent document contains original material subject to copyright protection. The copyright owner has no objection to the facsimile or digital download reproduction of all or part of the patent document, but otherwise reserves all copyrights.

BACKGROUND OF THE INVENTION

1. Field of the Invention

This invention pertains to trailer hitch guides for aligning the ball on a towing vehicle with the inverted ball socket on the trailer tongue and, more specifically, to such guides that allows a driver while backing up the towing vehicle towards the trailer, to automatically align the inverted ball socket disposed at a same height or slightly above the height of the ball.

2. Description of the Related Art

When towing a trailer with a towing vehicle, a driver will back up the trailer to the desired parking area and then disconnect the trailer from the ball mounted on the bumper or trailer hitch mounted on the towing vehicle. To disconnect the trailer's inverted ball socket from the ball, the trailer's tongue must be temporarily lifted either manually or with a jack to allow the ball to clear the lower edge of the ball socket. Once elevated, the towing vehicle is driven forward. The trailer tongue is then lowered and returned to the horizontal position.

When reconnecting the trailer to the towing vehicle, the towing vehicle is backed up to realign the ball with the ball socket on the trailer. Because the trailer tongue has been returned to the horizontal position when the trailer is parked, the trailer tongue must be lifted again to allow the ball to clear the bottom edge of the ball socket and align with the ball socket. If the trailer is relatively small, the trailer tongue can be moved side to side to align the ball socket with the ball. After the ball has been aligned with the socket, placing the ball directly under the socket, then the trailer tongue is lowered so the ball socket captures the ball.

Larger trailers are heavy and difficult to manually lift and move side to side. Usually, a driver estimates the location on the tongue ball socket and slowly backs up the towing vehicle to place the ball immediately in front of the ball socket. A jack mounted on the trailer tongue is used to lift the tongue and elevate the ball socket above the ball. The towing vehicle is then backed up to position the ball under the ball socket. The trailer tongue is then lowered so the ball socket captures the ball. If the driver is alone, he or she must repeatedly step out of the towing vehicle, review the relative locations and elevations of the trailer tongue, the ball socket, and the ball, and then return to the cab and reposition the towing vehicle. Sometimes, these tasks must be repeated several times which can be very time consuming and frustrating. While some towing vehicles have backup cameras that help the driver see the location of the ball and the ball socket, it is difficult to determine if the trailer tongue is sufficiently elevated to allow the ball to be aligned under the ball socket.

What is needed is an alignment system that enables a driver to back up the towing vehicle towards the trailer stored in the same height it was left with its ball socket substantially at the same height or at a height slightly above the ball that automatically aligns and lifts the trailer tongue and the ball socket over the ball as the towing vehicle is backing up and then and automatically drops the ball socket back to its original position and over the ball when it is properly aligned.

SUMMARY OF THE INVENTION

These and other objects of the invention are met by a trailer tongue alignment apparatus disclosed herein that automatically lifts and aligns the inverted ball socket on a trailer tongue disposed at an elevation equal or slightly above the ball mounted on a rear end of the towing vehicle as the towing vehicle is being slowly backed up towards the trailer. When the ball is directly positioned under the ball socket, the ball socket automatically falls and is properly aligned with the ball. When the trailer is being towed, a guide funnel used on the apparatus must be repositioned to an elevated position over the ball and ball socket enabling the towing vehicle when pulling the trailer to turn in any direction.

The alignment assembly includes a forward extending, tongue mount attached to the trailer ball receiver. The tongue mount includes a top mount and a bottom mount attached to the located on opposite top and bottom surfaces on a trailer ball receiver. The top mount includes a vertical front plate that extends upward and transversely over the top surface of the trailer ball receiver. The front plate is located in front to the ball socket on the trailer ball receiver when the tongue mount is attached to the trailer ball receiver. The bottom mount includes a vertical rear plate that extends downward and transversely under the bottom surface of the trailer ball receiver. The rear plate is located behind the ball socket when the tongue mount is attached to the trailer ball receiver. The top and bottom mounts both include U-shaped cutouts which are aligned and registered with the trailer ball receiver when the top and bottom mounts are attached to the trailer ball receiver.

In one embodiment, the top and bottom mounts are configured to be used with a trailer ball receiver that has side flanges that are sandwiched between the top and bottom mounts.

In another embodiment configured to be with a trailer ball receiver with straight side walls and no side flanges, the top mount includes a horizontal plate with a rearward extending cutout and two vertically aligned side arms located on opposite edges of the horizontal plate that extend upward around the sides of the trailer ball receiver when the horizontal plate is positioned under the trailer ball receiver. Mounted on the upper ends of the two side arms are inward extending tabs that extend over the top surface of the trailer ball receiver. An elevated, transversely aligned handle is connected to the two tabs that extends over the top surface of the trailer ball hitch. Located under the top mount is a bottom mount that also includes a horizontal plate with a cutout and a perpendicularly aligned rear plate. During assembly, the top mount is attached to the bottom mount so that the cutouts are aligne and registered under the trail ball receiver's socket. The two tabs and the handle positioned behind the trailer ball receiver's latch so that the latch may be manually operated to engage the ball.

In the second embodiment, the lower mount may include an optional transversely aligned front plate that is aligned and registered with the front surface of the trailer ball receiver. Mounted or formed on the bottom mount adjacent to the front edge of the cutout on the bottom mount is an upward extending lip 146 that extends into the socket in the trailer ball receiver when the top and bottom mounts are positioned and connected together on the trailer ball receiver.

The second embodiment alignment assembly also includes a guide member that connects in one of at least two possible positions to the tongue mount's vertical front plate. The guide member includes a rear receiver bracket and a forward guide funnel. The rear receiver bracket includes two vertical side plates and a vertical transverse plate that extends between the two side plates. When assembled, the transverse plate is aligned parallel and placed in front of the top mount's front plate. In one embodiment, a removable pin or bolt selectively engages one of at least two holes vertically aligned on the front plate. Formed on the transverse plate near its lower edge is a compatible hole or detent. During use, the pin, bolt or detent selectively engages different holes or detents on the front plate to lock the guide member in either a lowered position on the front plate or in a raised position over the front plate. Optional slots or tabs are formed on the front surface of the front plate which may be engaged by the transverse plate to allow the transverse plate to slide vertically over the front plate.

Each side plate may also include an optional, lower support tab with a vertical slot formed therein that receives a locking pin on the tongue mount that prevents the tongue mount from completely disengaging from the guide member.

Affixed and extending forward from the guide member and disposed between the receiver's two side plates is a guide funnel. The guide funnel includes a conical-shaped top plate with vertically aligned side walls. The bottom of the guide funnel is open and unobstructed. Formed in the guide funnel is a wide front opening and a narrow rear opening. The longitudinal axis of the guide funnel is diagonally aligned approximately 16 degrees above the horizontal plate used on the top mount. The guide funnel's length is sufficient so that the rear opening is located approximately under the guide member's transverse plate and directly under the ball socket.

After mounting the tongue mount to the trailer ball receiver, the locking pin or bolt that attaches the front plate to the transverse plate is removed to allow the guide member to fall or move downward to its lowest position on the tongue mount. The locking pin or bolt is then inserted into the aligned holes on the front plate and the transverse plate to securely connect the front plate and transverse plate together. As the towing vehicle is backing up, the ball on the towing vehicle is forced into the front opening on the guide funnel. An upward force is exerted on the guide funnel simultaneously lifting the guide funnel, the guide member, the tongue mount, and the trailer tongue. As the towing vehicle continues to move rearward, the ball continues to travel under the guide funnel and continues to lift the trailer tongue. Eventually, the ball eventually travels through the rear opening and clears the guide funnel which causes the trailer tongue to fall. The ball socket also falls and is aligned with the ball. When the ball clears the funnel, a loud sound is also generated that can be heard by the driver informing him or her that the ball socket has properly aligned with the ball. In most instances, the driver is able to see that trailer fall and return to its original position.

When driving, the guide funnel must be elevated over the trailer hitch and ball so that the towing vehicle may turn in both directions. To elevate and lock the guide funnel in an elevated position, the pin or bolt that hold the front plate and transverse plate together is removed from the pair of lower holes. The transverse plate is then slide vertically upward three to six inches over the front plate and the lower hole on the transverse plate is aligned with an upper hole on the front plate. The pin or bolt is then inserted into the aligned holes to lock the transverse plate in an elevated position on the front plate.

DESCRIPTION OF THE PREFERRED EMBODIMENT(S)

These and other objects of the invention are met by a trailer tongue alignment assembly 10 disclosed herein that automatically lifts and aligns the inverted ball socket 92 on a trailer tongue receiver 90 over the ball 95 conventionally mounted on a bumper or a trailer hitch attached to a towing vehicle as the towing vehicle is being slowly backed up towards the trailer. The alignment assembly 10 automatically aligns and elevates the ball socket 92 on a trailer tongue receiver 90 to a cleared position so the ball 95 may be disposed directly under the ball socket 92.

The alignment assembly 10 includes a forward extending tongue mount 20 attached to the trailer ball receiver 90. The tongue mount 20 includes an L-shaped top mount 30 that includes a vertical front plate 32 perpendicularly aligned to the tongue's longitudinal axis 91. The top mount 30 also includes a horizontal plate 36 perpendicularly aligned with the front plate 32 with a centrally aligned, U shaped cutout 40 formed therein. A plurality of holes 37 are formed near the lateral edges of the horizontal plate 36 that receive threaded connectors 34, 35 that attach the top mount 30 either to the trailer ball receiver 90 or to a lower bottom mount 40 discussed further below.

Figure 6:
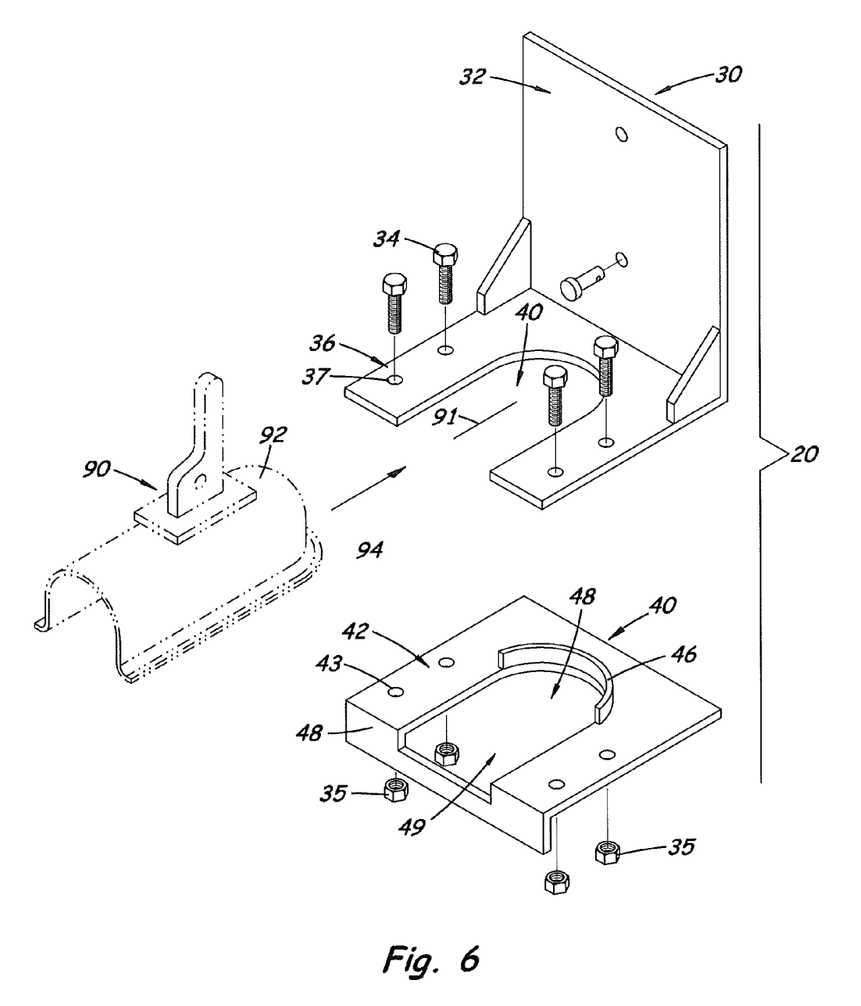
FIG. 6 is an exploded perspective view of the tongue mount separated into an top mount and a bottom mount with the trailer tongue ball received being disposed between the two mounts.
Figure 7:
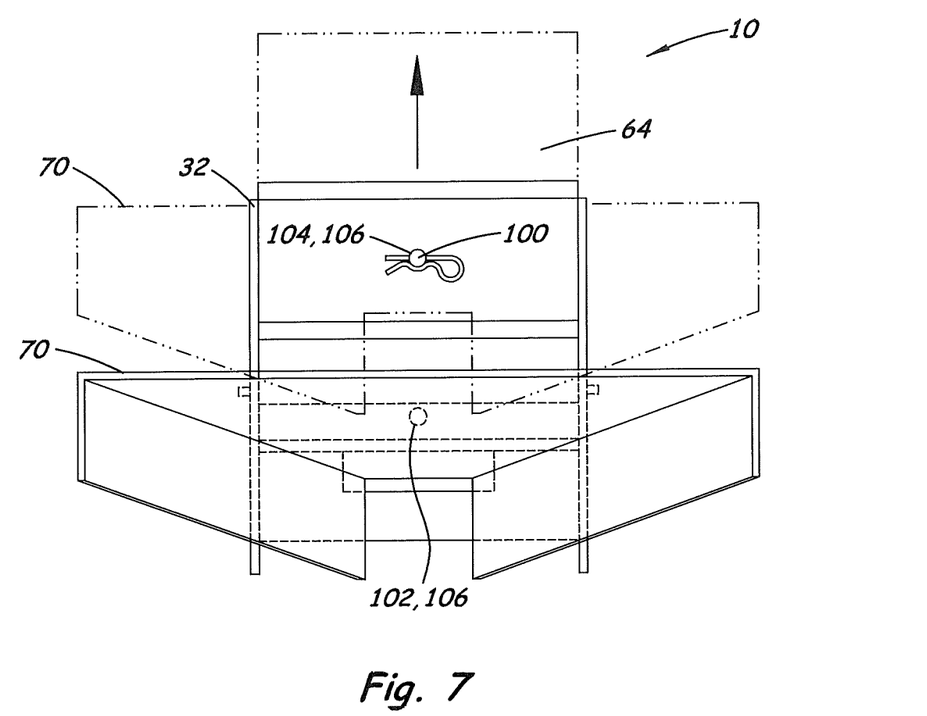
FIG. 7 is a front elevational view of the trailer tongue alignment apparatus similar to the view shown in FIG. 2 showing the guide member locked and raised in an elevated position above the tongue mount.

The bottom mount 40 is an L-shaped structure disposed over the bottom surface of the trailer ball receiver 90 opposite the top mount 30. The bottom mount 40 includes a horizontal plate 42 that is aligned and registered with the top mount's horizontal plate 36. The horizontal plate 42 includes a U-shaped cutout 48 substantially identical to the U-shaped cutout on plate 32. An optional semi-circular lip 46 may be attached or formed on the top surface of the horizontal plate 42 that fits into the U-shaped cutout 40 on the top mount 30 to properly align the ball socket 92 over the bottom mount 40. Attached to the rear end of the horizontal plate 41 is a downward extending vertical rear plate 48 with small rectangular cutout 49 formed therein and aligned with the U-shaped cutout 48. When attached to the ball socket 92, the rear plate 48 is located behind the ball socket 92.

A plurality of holes 37, 43 is formed along the perimeter edges to the top and bottom plates 36, 40, respectively. In the first embodiment, the perimeter flange edges 94 of the ball receiver 92 are placed between the two plates 36, 40. A plurality of threaded bolts 34 and nuts 35 are the extended through the holes 37, 43 to press the two plates 36, 41 against the flanges 94 on the ball receiver 90 to connect the tongue mount 10 to the ball receiver tongue 90.

Figure 1:
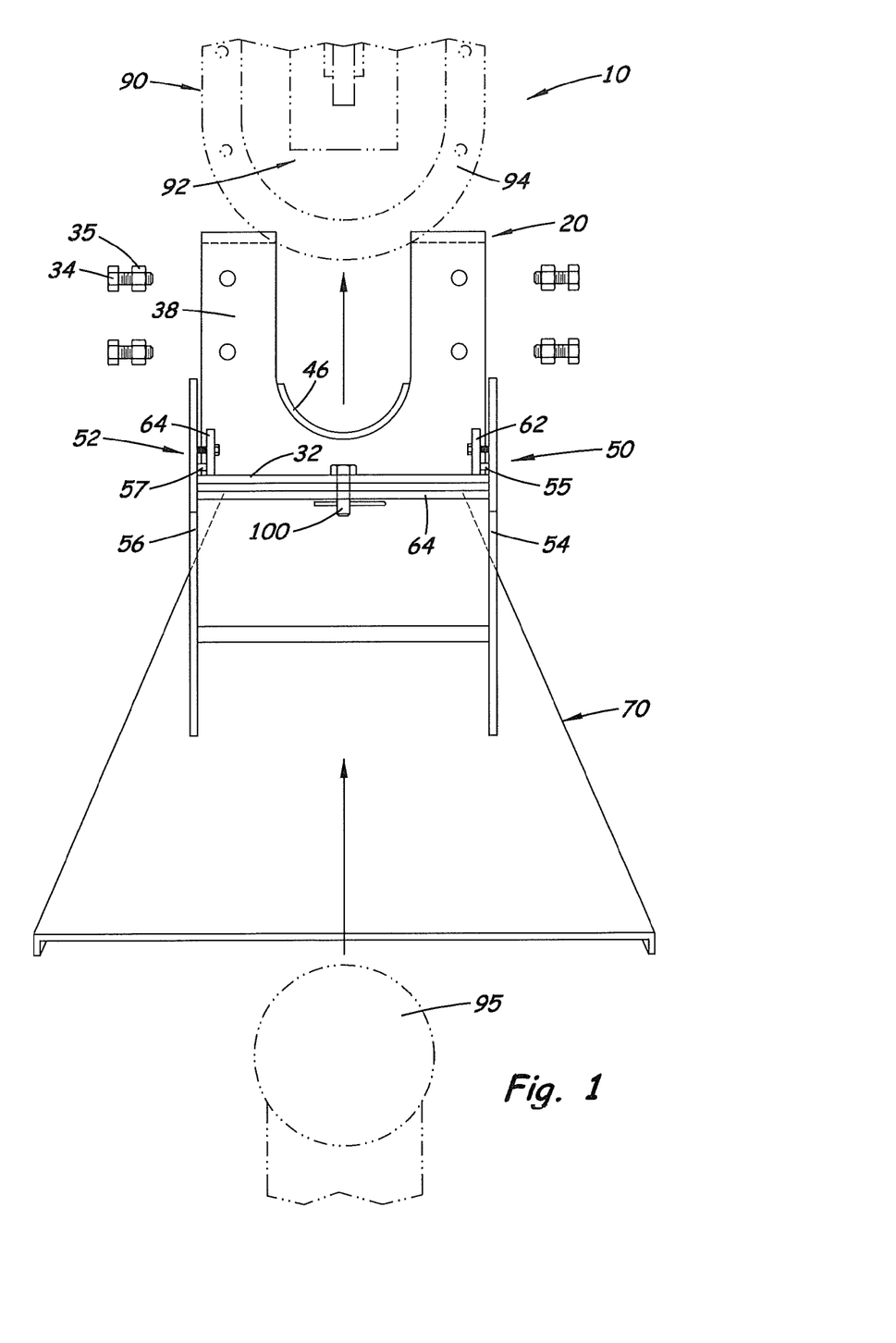
FIG. 1 is a top plan view of the trailer tongue alignment apparatus that includes a tongue mount attached to the ball receiver socket on a trailer tongue and showing the ball attached to a towing vehicle moving rearward into a lowered guide member that includes a forward extending guide funnel that receives the ball.
Figure 2:
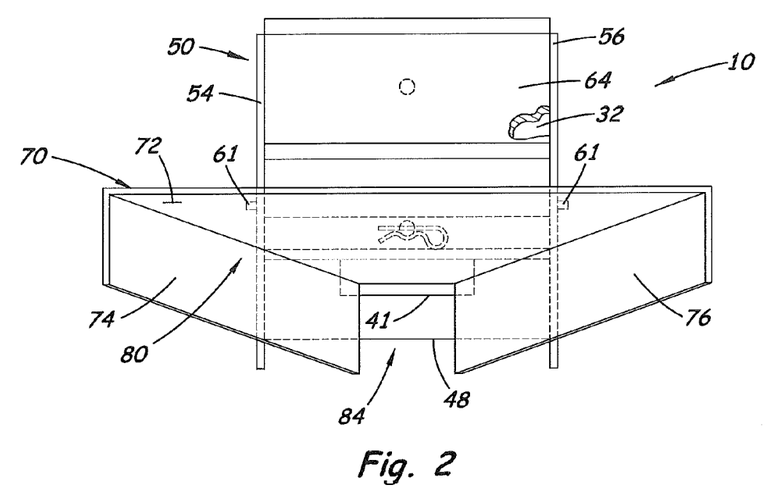
FIG. 2 is a front elevational view of the trailer tongue alignment apparatus shown in FIG. 1.
Figure 3:
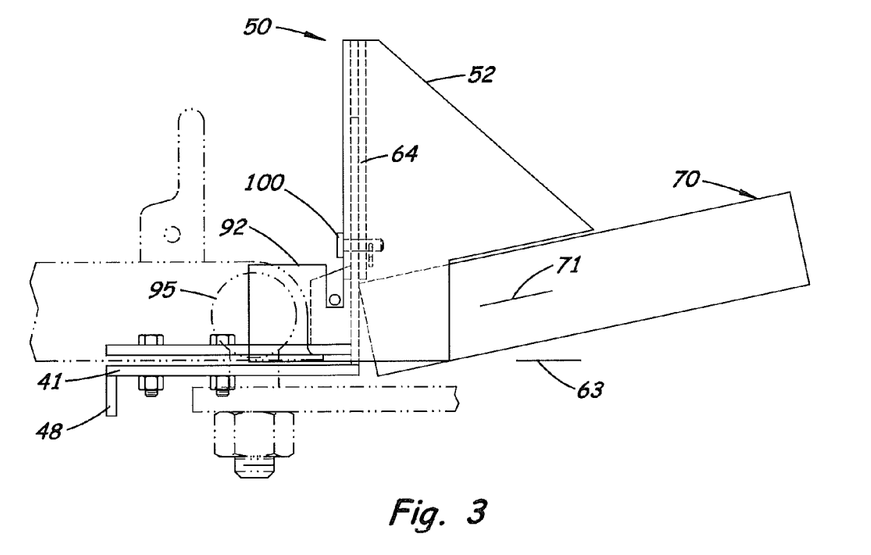
FIG. 3 is a side elevational view of the trailer tongue alignment apparatus showing the ball disposed inside the ball socket and the guide member in a locked elevated position used with the towing vehicle is driven.
Figure 4:
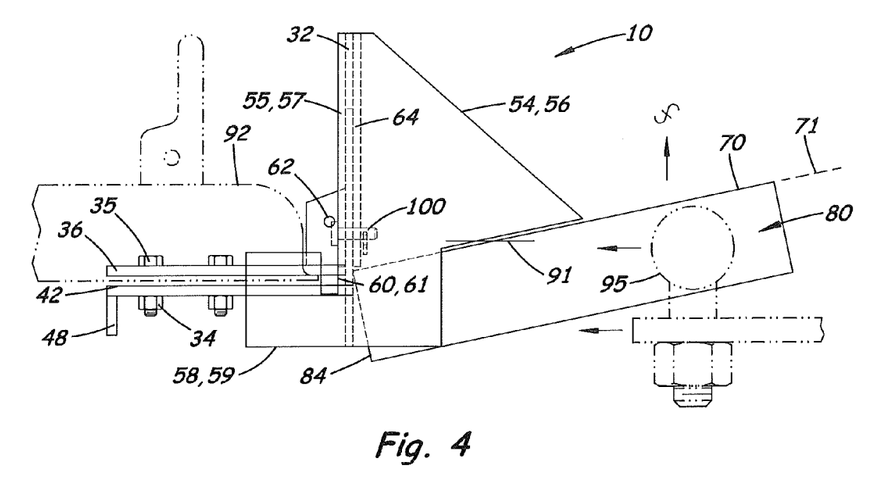
FIG. 4 is a side elevational view of the trailer tongue alignment apparatus showing the guide member in a lowered position and showing a ball disposed inside the guide funnel and moving rearward and applying an upward force on the guide funnel.
Figure 5:
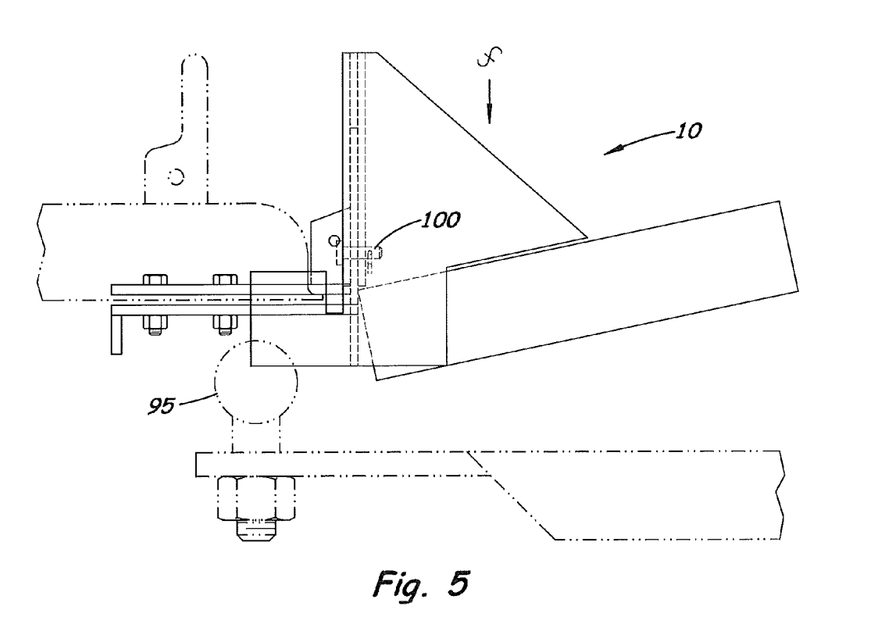
FIG. 5 is a side elevational view of the trailer tongue alignment apparatus showing the guide member in a lowered position and showing the ball aligned under with the ball socket.

The alignment assembly 10 also includes a guide member 50 that attaches to a vertical front plate 32 attached to the top mount 30. As shown in FIG. 1, the guide member 50 includes a rear receiver bracket 52 and a forward extending, diagonally aligned guide funnel 70. The rear receiver bracket 52 includes two vertical side walls 54, 56 and a vertical transverse plate 64. Attached to the inside surface of the vertical plates 54, 56 are two gussets 62, 64, respectively. The two vertical side plates 54, 56 are sufficiently spaced apart and the width of the transverse plate 64 receives the front plate 32 on the tongue mount when positioned against the rear surface of the transverse plate 64. Aligned strips 55, 57 are mounted on the side plates 54, 56, respectively to hold the vertical plate 32 in a parallel alignment with the transverse plate 64. Each side plate 54, 56 may also include a lower support tab 58, 59, respective with a vertical slot 60, 61 formed therein, respectively, that receives an alignment pin 62 mounted on a gusset attach to the front plate 32.

When assembled, the transverse plate 64 is aligned parallel and placed in front of the top mount's front plate 3. Attached to the front plate 32 is a removable pin, bolt or detent 100 that selectively engages one of at least two holes 102, 104 vertically aligned on the front plate 32. Formed on the transverse plate 64 near its lower edge is a compatible hole 106, or detent. During use, the pin, bolt or detent 100 is selectively engage different holes or detents 102 or 104 on the front plate 32 to lock the guide member in either a locked lowered position on the front plate or a locked raised position over the front plate 32.

Extending forward from the guide member 50 and disposed between the two side walls 54, 56 is a rigid, upward extending, diagonally aligned guide funnel 70. The guide funnel 70 includes a conical shaped top plate 72 with vertically aligned side walls 74, 76. Formed in the guide funnel 70 is a wide front opening 80 and a narrow rear opening 84. The bottom of the guide funnel 70 is open and unobstructed. In the embodiment shown herein, the guide funnel 70 is approximately 8¼ inches in length and the front opening 80 is approximately 10 inches in width. The side walls 74, 76 are approximately 1½ inches in width and the rear opening 84 is approximately 3½ inches in width. Also, the longitudinal axis 71 of the guide funnel 70 is diagonally aligned approximately 16 degrees above the horizontal axis 91. The rear opening 84 is under the guide member's transverse plate 64.

As the towing vehicle is backed up, the ball 95 eventually clears the guide funnel 70 and the ball socket 92 falls over and aligns with the ball 95. When the trailer tongue receiver 90 falls back into its original position after the ball 95 travels through the narrow opening on the guide full, a loud sound is generated that can be heard by the driver informing him or her that the ball socket 92 has fallen and in alignment with the ball 95.

The guide member 50 is raised on the front plate 32 when towing the trailer. When disconnecting the trailer from the towing vehicle, the trailer tongue is raised in a normally manner until the ball socket 92 clears the top surface of the ball 95. The towing vehicle is then moved. The driver may then lower the guide member 50 on the front plate 32 alignment assembly 10 so the alignment assembly 10 is ready to reattach the trailer to the ball 95. The driver slowly reverses the towing vehicle to align the ball 95 with the front opening 80 on the guide funnel 70. The towing vehicle continues in the reverse direction forcing the trailer tongue upward until the ball 95 passes through the narrow rear opening and the trailer tongue falls to its original position generating a sound that indicates the ball socket 92 is now aligned over the ball 95.

When driving, the guide funnel 70 must be elevated over the trailer hitch and ball 95 so the towing vehicle may turn in both directions. To elevate and lock the guide funnel 70 in an elevated position, the pin or bolt 100 that hold the front plate 32 and transverse plate 64 together is removed from the pair of lower holes 38, 68. The transverse plate 64 may slide vertically upward three to six inches over the front plate 32 and the lower hole 68 on the transverse plate 64 is aligned with an upper hole 39 on the front plate 32. The pin or bolt 100 is then inserted into the aligned holes 39, 69 to lock the transverse plate 64 in an elevated position on the front plate 32.

As stated above, the trailer tongue alignment assembly 10 is designed to be used with trailer ball receivers 90 that includes laterally extending side flanges 94 that are sandwiched between the top and bottom mounts 30, 40. In another embodiment shown in FIGS. 8-12, the trailer tongue alignment assembly 110 is configured to be used with trailer ball receivers 190 with straight side walls 192 and straight front wall 194 and no lateral or forward extending flanges.

The tongue alignment assembly 110 uses a modified top mount 130 and a modified bottom mount 140. The top mount 130 includes a horizontal plate 131 with a rearward extending cutout 132. The top mount 130 also includes two vertically aligned side arms 133, 135 that extend upward around the opposite sides of the trailer ball receiver 190. Mounted on the upper ends of the two side arms 133, 135 are inward extending tabs 134, 136, respectively, that extend inward over the top surface of the trailer ball receiver 190. An elevated, transversely aligned handle 135 is connected to the two tabs 134, 13, and extends over the trailer ball receiver 190. During assembly, the top mount 130 is aligned under the trailer ball receiver 190 so that the cutout 132 is aligned under the socket 196. The handle 135 is then extended over the top surface of the trailer ball receiver 190 and behind the pivoting latch 197. The top mount 130 includes a short, downward extending vertical plate 162 that extends between the two side arms 133, 135. During assembly, the vertical plate 162 is aligned with the front surface of the trailer ball receiver 190.

The front of the top mount 130 is then manually elevated so the horizontal plate 131 is aligned under the trailer ball receiver's socket. The horizontal plate 141 on the bottom mount 140 is aligned parallel and attached to the horizontal plate 131 on the top mount 130 via threaded bolts 120. When the top mount 130 is attached to the bottom mount 140, the two tabs 134, 136 and the handle 135 extend over the top surface of the trailer ball receiver 190 and behind the trailer ball receiver's pivoting latch 197 so that the pivoting latch 197 may be manually operated to engage the ball 95. The vertical plate 162 is positioned adjacent to and in front of the front surface of the trailer ball receiver 190.

In the second embodiment, the bottom mount 140 includes a horizontal plate 141 and rear, downward extending vertical plate 142, and a cutout 144. Mounted or formed on the bottom mount 140 adjacent to the front edge of the cutout 144 is an upward extending lip 146 that extends into the socket cavity 195 of the trailer ball receiver 190 when the top and bottom mounts 130, 140 are connected together and positioned under on the trailer ball receiver 190.

Figure 8:
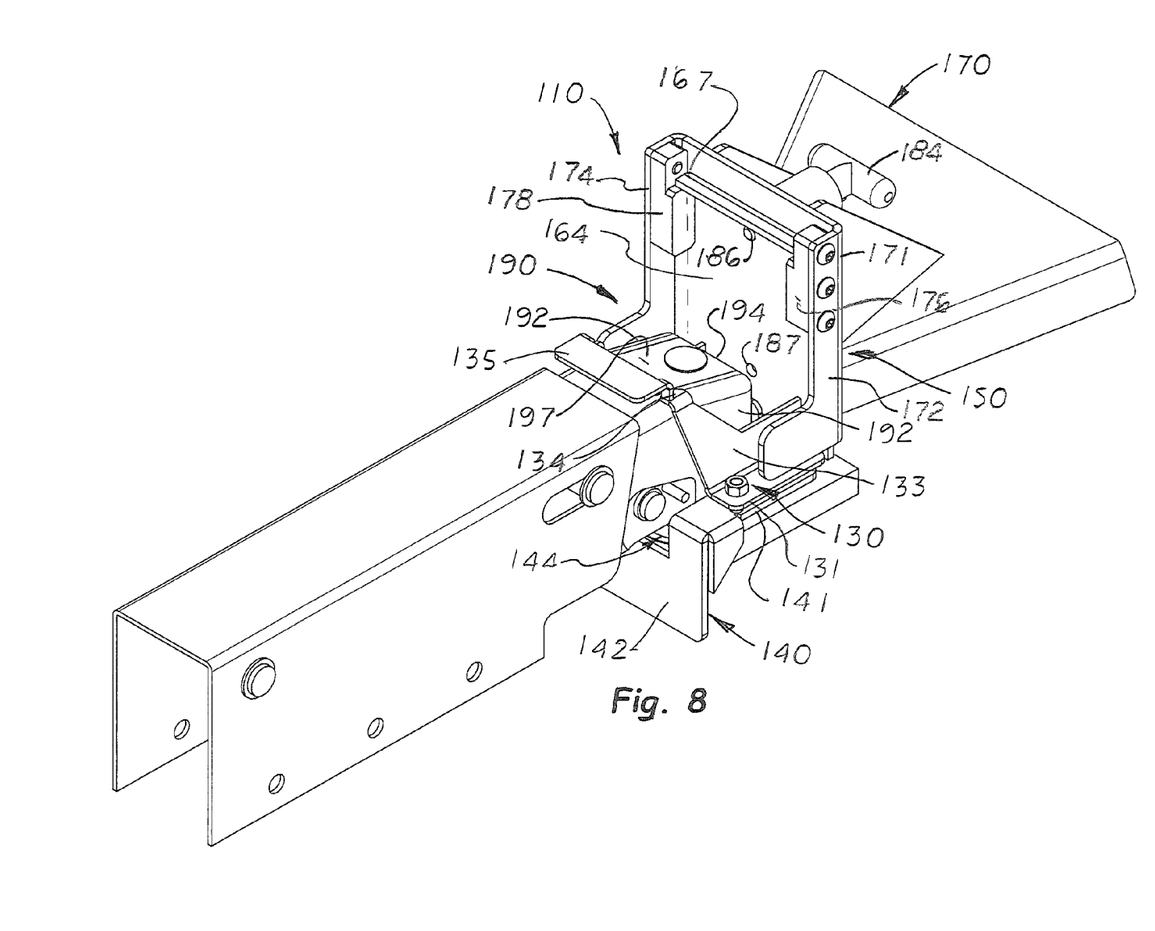
FIG. 8 is a perspective view of an alternative embodiment of the trailer tongue alignment apparatus.
Figure 9:
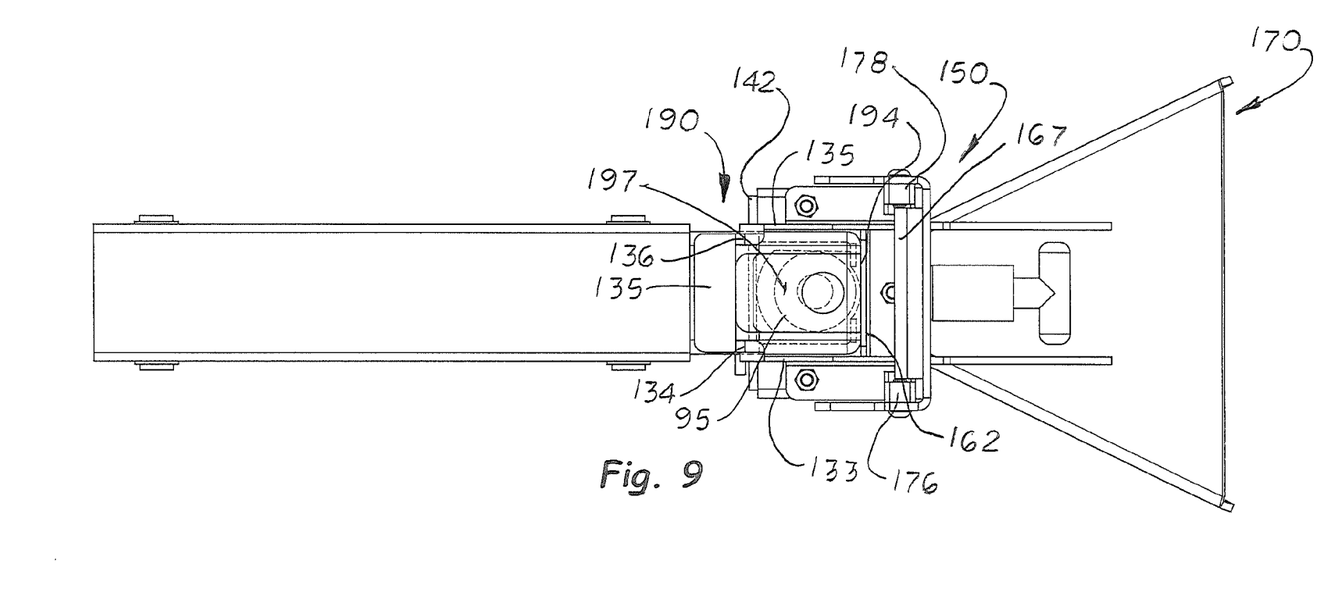
FIG. 9 is a top plan view of the trailer tongue alignment apparatus as shown in FIG. 8.
Figure 10:
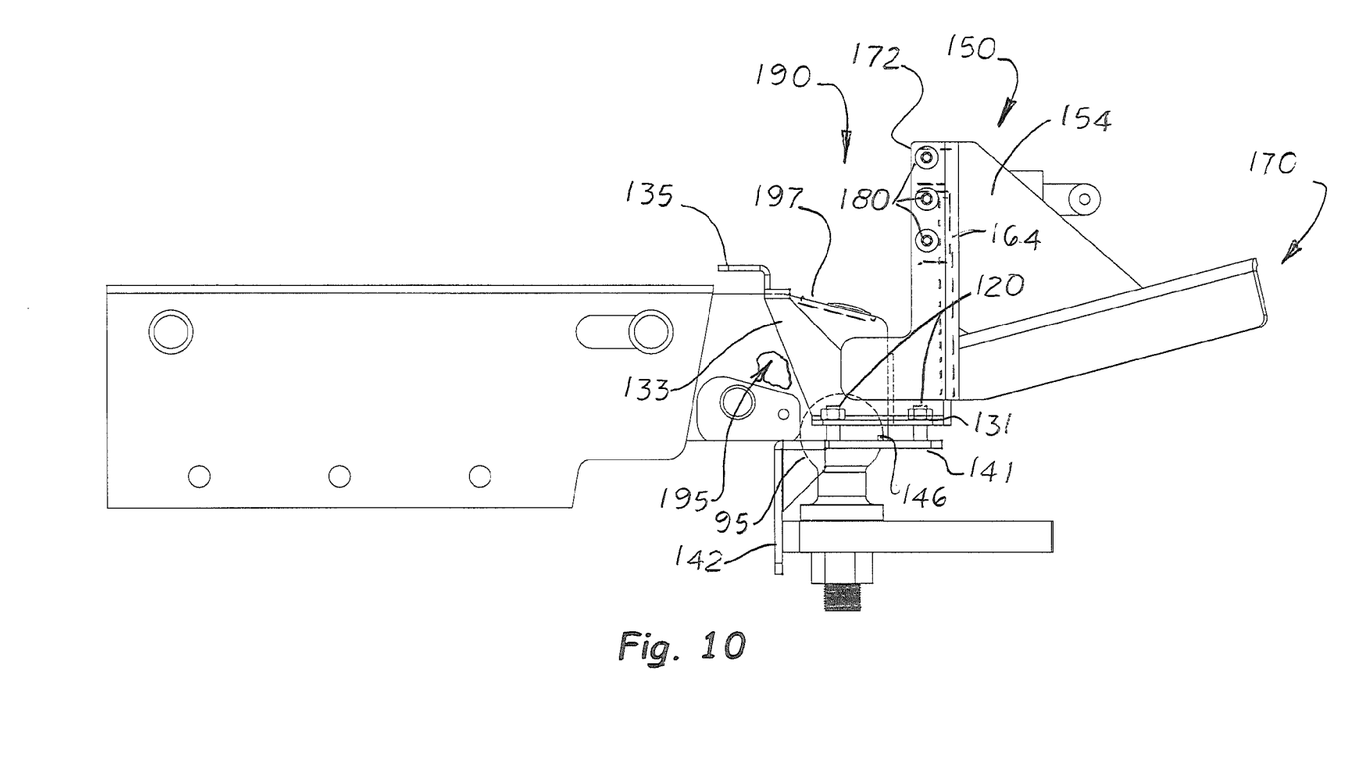
FIG. 10 is a side elevational view of the trailer tongue alignment apparatus as shown in FIGS. 8 and 9.
Figure 11:
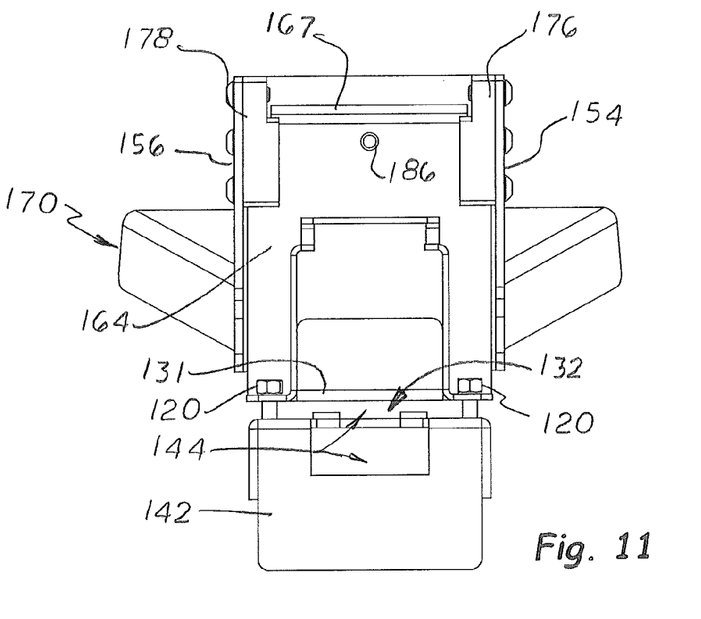
FIG. 11 is a rear end elevational view of trailer tongue alignment apparatus as shown in FIGS. 8-10.
Figure 12:
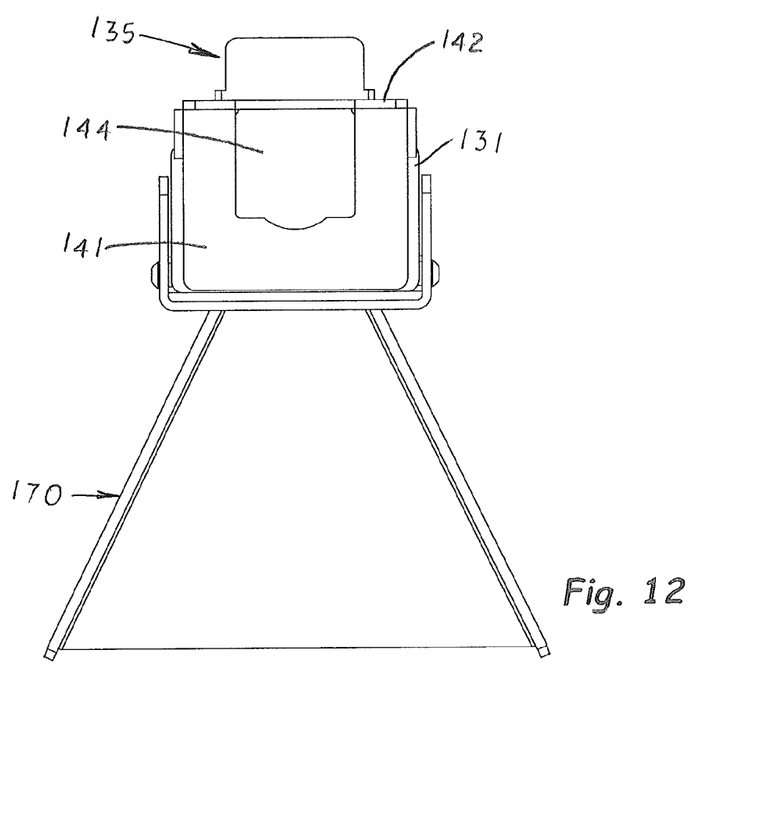
FIG. 12 is a bottom plan view of the end elevational view of the trailer tongue alignment apparatus as shown in FIGS. 8-11.

The top mount 130 includes a vertical front plate 164 separately attached or formed on the end of the horizontal plate 131. Formed on the upper end of the front plate 164 is a rearward extending upper angled edge 167. During assembly, the front plate 164 is located adjacent to a transition plate 171 attached to the modified guide member 150. The transition plate 171 is disposed between two perpendicularly aligned side plates 172, 174. Attached to the inside surfaces of the two side plates 172, 174 are two stop members 176, 178, respectively. Gaps are formed between the inside edges of the two stop members 176, 178 and the transition plate 171 which receives the opposite vertical edges of the front plate 164. During final assembly, the stop members 176, 178 are manually attached to the side plates 172, 174 with threaded bolts 180. During assembly, the front plate 164 is located inside the gap and the upper angled edge 167 is positioned against the stop members 176, 178. A spring handle 184 is inserted into holes 186, 187 formed on the front plate 164 and transition plate 171 to hold them together. FIG. 8 shows the spring handle 184 inserted into the top holes 186. If the spring handle 184 is removed from the top holes 186, the transition plate 171 can slide downward over the front plate 164 thereby lowering the funnel 170. The spring handle 184 is then inserted into the lower hole 187 to connect the front plate 164 and the transition plate 171.

When the trailer assembly 110 is attached to the trailer, the towing vehicle is backed up, the ball 95 eventually clears the guide funnel 170 and the ball socket 192 falls over and aligns with the ball 95. When the trailer tongue receiver 190 falls back into its original position after the ball 95 travels through the narrow opening on the guide full, a loud sound is generated that can be heard by the driver informing him or her that the ball socket 192 has fallen and in alignment with the ball 95.

When disconnecting the trailer from the towing vehicle, the trailer tongue is raised in a normally manner until the ball socket 192 clears the top surface of the ball 95. The towing vehicle is then moved. The driver may then lower the guide member 150 on the front plate 132 alignment assembly 10 so the alignment assembly 110 is ready to reattach the trailer to the ball 95. The driver slowly reverses the towing vehicle to align the ball 95 with the front opening 180 on the guide funnel 170. The towing vehicle continues in the reverse direction forcing the trailer tongue upward until the ball 95 passes through the narrow rear opening and the trailer tongue falls to its original position generating a sound that indicates the ball socket 92 is now aligned over the ball 95.

In compliance with the statute, the invention described herein has been described in language more or less specific as to structural features. It should be understood however, that the invention is not limited to the specific features shown, since the means and construction shown, comprises the preferred embodiments for putting the invention into effect. The invention is therefore claimed in its forms or modifications within the legitimate and valid scope of the amended claims, appropriately interpreted under the doctrine of equivalents.

I claim:

1. An alignment apparatus for a trailer tongue with trailer ball receiver with an inverted ball socket, comprising;
    a. a tongue mount that includes a top mount and a bottom mount each including with a horizontal plate that are aligned and registered to extend under a trailer ball receiver each with a cutout formed therein sufficient width to allow the ball attached to a towing vehicle to slide vertically therein and into the trailer ball receiver, said top mount includes two side walls sufficiently spaced apart to fit around the opposite sides of a trailer ball receiver each with an inward extending tab that extends over the top surface of the trailer ball receiver, said top mount includes a transversely aligned front plate located in front of the front surface of the trailer ball receiver, said bottom mount includes a downward extending, perpendicular aligned rear plate located behind said cutout;
    b. a plurality of threaded connectors that selectively connected together and securely attaches to said trailer tongue
    c. a guide member extending forward from said top mount, said guide member including a two side plates and a transverse plate located between said side plates, said transverse plate slides vertically and selectively locks in lower position or elevated position to said front plate on said top mount, said guide member includes a forward extending guide funnel attached to said side plates or said transverse plate, said guide funnel includes a top surface, two side surfaces, an open bottom, a wide front opening and a narrow rear opening, said rear opening being located adjacent to said cutouts formed on said top mount and said bottom mount, said guide funnel is extends upward and forward from said tongue mount; and,
    c. means for selectively locking said transverse plate on said front plate to sufficiently lower said guide funnel and said front opening on said guide funnel to capture a ball attached to towing vehicle moving towards said guide funnel or sufficiently raise said guide funnel above to allow the towing vehicle to freely turn.

2. The alignment apparatus for a trailer tongue, as recited in claim 1, wherein said means to selectively locking said guide funnel in a lowered or raised position relative to said front plate is at least two holes formed on said front plate and at least one hole formed on said transverse plate, said holes on said front plate and said one hole on said transverse plate configured to receive a bolt or pin to selectively hold said transverse plate in a locked lowered or a locked raised position over said front plate.

3. The alignment apparatus for a trailer tongue, as recited in claim 1, wherein said guide funnel includes a longitudinal axis that is diagonally aligned approximately 16 degrees above the top mount.

4. The alignment apparatus for a trailer tongue, as recited in claim 2, wherein said guide funnel includes a longitudinal axis that is diagonally aligned approximately 16 degrees above the top mount.

5. The alignment apparatus for a trailer tongue, as recited in claim 1 wherein said guide funnel is 8 to 10 inches in length, 1 to 3 inches height, and said front opening is approximately 8 to 12 inches in width and said rear opening is approximately 3 to 5 inches wide.

6. The alignment apparatus for a trailer tongue, as recited in claim 2 wherein said guide funnel is 8 to 10 inches in length, 1 to 3 inches height, and said front opening is approximately 8 to 12 inches in width and said rear opening 84 is approximately 3 to 5 inches wide.

7. The alignment apparatus for a trailer tongue, as recited in claim 4 wherein said guide funnel is 8 to 10 inches in length, 1 to 3 inches height, and said front opening is approximately 8 to 12 inches in width and said rear opening 84 is approximately 3 to 5 inches wide.

8. The alignment apparatus for a trailer tongue, as recited in claim 1, wherein said top and bottom mounts are connected together with a plurality of threaded nuts and bolts.

9. The alignment apparatus for a trailer tongue, as recited in claim 2, wherein said top and bottom mounts are connected together with a plurality of threaded nuts and bolts.

10. The alignment apparatus for a trailer tongue, as recited in claim 3, wherein said top and bottom mounts are connected together with a plurality of threaded nuts and bolts.

\* \* \* \* \*